US006904752B2

United States Patent
Foster et al.

(10) Patent No.: US 6,904,752 B2
(45) Date of Patent: Jun. 14, 2005

(54) ENGINE CYLINDER DEACTIVATION TO IMPROVE THE PERFORMANCE OF EXHAUST EMISSION CONTROL SYSTEMS

(75) Inventors: Michael Ralph Foster, Columbia Ville, MI (US); Matthew G. Foster, Davison, MI (US); Kenneth S. Price, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/304,119

(22) Filed: Nov. 25, 2002

(65) Prior Publication Data

US 2003/0121249 A1 Jul. 3, 2003

Related U.S. Application Data
(60) Provisional application No. 60/334,507, filed on Nov. 30, 2001.

(51) Int. Cl.$^7$ .................................................. F01N 3/00
(52) U.S. Cl. ............................ 60/295; 60/285; 60/301
(58) Field of Search ........................ 60/274, 285, 295, 60/299, 301, 311; 123/198 F, 481

(56) References Cited

U.S. PATENT DOCUMENTS

| | | | | |
|---|---|---|---|---|
| 4,134,261 A | * | 1/1979 | Iizuka et al. .................. 60/276 |
| 4,256,074 A | * | 3/1981 | Sugasawa et al. ............. 60/276 |
| 4,337,740 A | * | 7/1982 | Sugasawa et al. ........... 123/672 |
| 4,404,796 A | * | 9/1983 | Wade ............................ 60/274 |
| 4,467,602 A | * | 8/1984 | Iizuka et al. .................. 60/276 |
| 5,307,772 A | | 5/1994 | Rao et al. |
| 5,813,383 A | | 9/1998 | Cummings |
| 5,927,102 A | | 7/1999 | Matsuo et al. |
| 6,023,929 A | | 2/2000 | Ma |
| 6,128,899 A | * | 10/2000 | Oono et al. ................... 60/295 |
| 6,164,065 A | * | 12/2000 | Denari et al. ................. 60/284 |
| 6,233,922 B1 | | 5/2001 | Maloney ....................... 60/276 |
| 6,233,927 B1 | * | 5/2001 | Hirota et al. .................. 60/297 |
| 6,293,267 B1 | | 9/2001 | Smith et al. ................. 701/108 |
| 6,336,071 B2 | * | 1/2002 | Grizzle et al. ............... 701/115 |
| 6,349,541 B1 | * | 2/2002 | Gruden et al. ................ 60/312 |
| 6,367,462 B1 | | 4/2002 | McKay et al. .............. 123/399 |
| 6,401,853 B1 | | 6/2002 | Turski et al. ................. 701/86 |
| 6,422,189 B1 | | 7/2002 | Pierik ....................... 123/90.16 |

(Continued)

OTHER PUBLICATIONS

"Reduced Fuel Consumption and Emissions through Cylinder Deactivation" by M.H. Sandford, et al SAE 994014.

"Impact of Alkali Metals on the Performance and Mechanical Properties of NOx Adsorber Catalysts" by D. Dou et al SAE 2002–01–0734.

"A NOx Adsorber Diagnostic System for Direct–Injection Gasoline Applications" by J. Theis, et al from Fuel Economy & After–Treatment Development, Oct. 5–7, 1999, Stuttgart, Germany.

"Variable Valve Timing Final Progress Report Year 1" SWRI Project No. 03–03271 prepared for Clean Diesel–III Program Participants, Jan. 2001.

Primary Examiner—Thomas Denion
Assistant Examiner—Diem Tran
(74) Attorney, Agent, or Firm—Jimmy L. Funke

(57) ABSTRACT

The invention provides a controller and cylinder deactivation system to regenerate an exhaust aftertreatment device for a multicylinder engine that operates primarily at an air/fuel ratio that is lean of stoichiometry. The invention uses the cylinder deactivation system to control temperature and air/fuel ratio of an exhaust gas feedstream going into an aftertreatment device. The invention also increases the amount of fuel delivered to each non-deactivated cylinder by an amount sufficient to maintain operating power of the engine. The regeneration action includes desorbing NOx from a NOx adsorber catalyst, desulfating the NOx adsorber catalyst, and purging a diesel particulate trap.

8 Claims, 2 Drawing Sheets

U.S. PATENT DOCUMENTS

| | | | |
|---|---|---|---|
| 6,439,176 B1 | 8/2002 | Payne et al. | 123/90.12 |
| 6,499,451 B1 | 12/2002 | Hendriksma et al. | 123/198 F |
| 6,516,608 B1 * | 2/2003 | Poggio et al. | 60/284 |
| 6,535,809 B1 | 3/2003 | Beyer et al. | 701/84 |
| 6,588,394 B2 | 7/2003 | Zheng | 123/198 F |
| 6,588,409 B2 | 7/2003 | Maloney et al. | 123/686 |
| 6,615,129 B2 | 9/2003 | Kabasin | 701/110 |
| 6,622,691 B2 | 9/2003 | Bagnasco et al. | 123/295 |
| 2002/0019597 A1 | 2/2002 | Glugla et al. | |

* cited by examiner

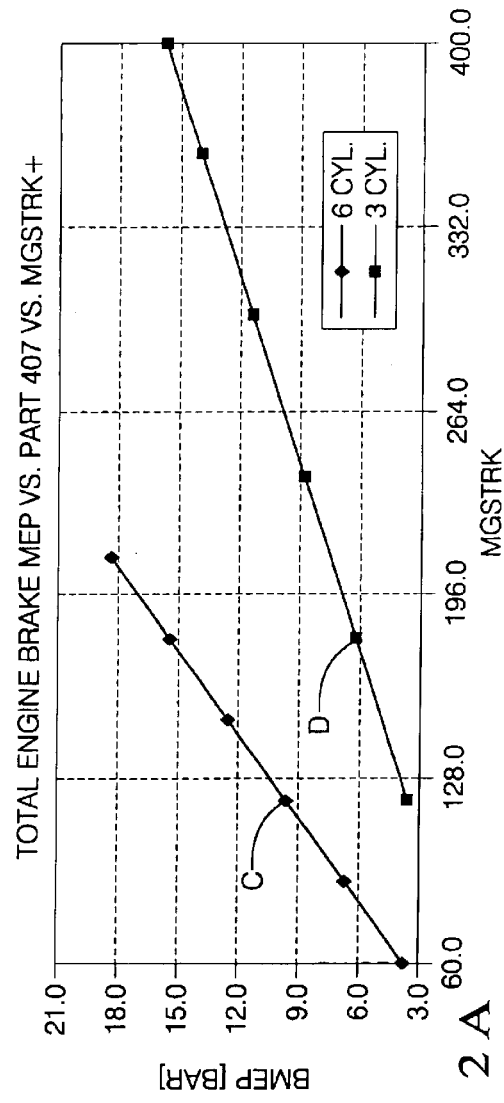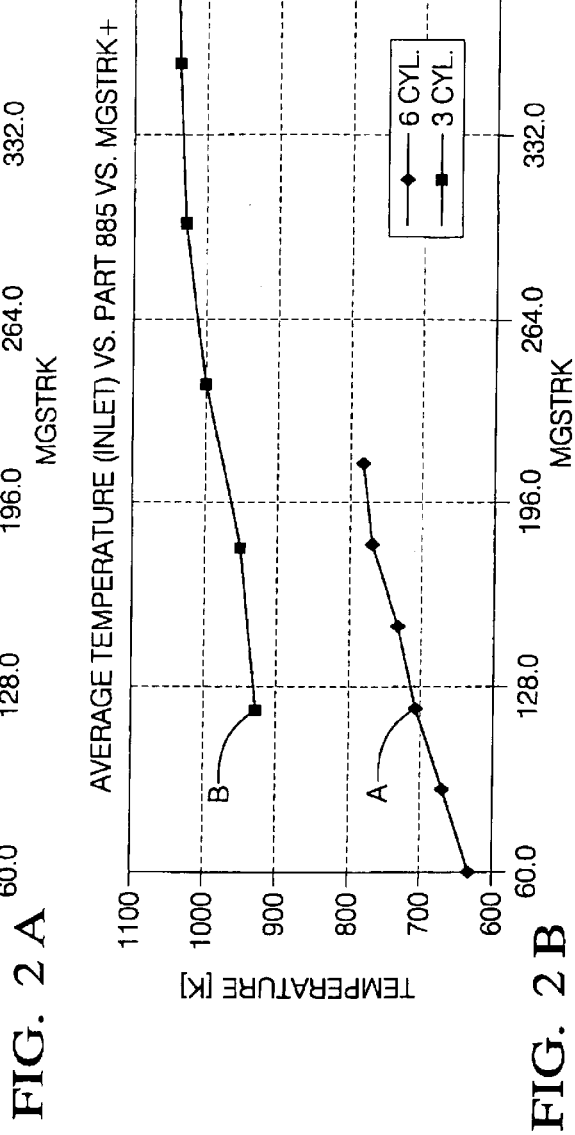
FIG. 2A
FIG. 2B

ENGINE CYLINDER DEACTIVATION TO IMPROVE THE PERFORMANCE OF EXHAUST EMISSION CONTROL SYSTEMS

INCORPORATION BY REFERENCE

Applicant incorporates by reference herein provisional Patent Application No. 60/334,507, which was filed in the U.S. Patent and Trademark Office on Nov. 30, 2001, and was entitled "Engine Cylinder Deactivation to Improve the Performance of Exhaust Emission Control Systems".

Applicant also incorporates by reference herein patent application Ser. No. PCT/US02/37813, which was filed on Nov. 25th, 2002 in the U.S. Patent and Trademark Office and is entitled "Engine Cylinder Deactivation to Improve Vehicle Interior Heating and Defrosting".

TECHNICAL FIELD

This invention pertains generally to internal combustion engine control systems, and more specifically to engine valvetrain mechanisms and exhaust aftertreatment systems.

BACKGROUND OF THE INVENTION

Internal combustion engines, including compression ignition engines and spark ignition engines regularly undergo redesign efforts to improve efficiency and enhance fuel economy. Compression-ignition engines and direct-injection spark-ignition engines are gaining in popularity due in part to improved fuel economy, which may exceed 20% improvement compared to a similarly-sized, conventional spark-ignition engine. Compression-ignition engines and direct-injection spark-ignition engines operate with excess air in the combustion process, which is also referred to as operating lean of stoichiometry. An engine that operates lean of stoichiometry can do so without a throttle valve in the air intake manifold. Stoichiometry is an air/fuel ratio at which there is a sufficient amount of oxygen from the air mixed with the fuel to completely oxidize the fuel during combustion. When air can freely flow into the cylinders on an intake stroke of a combustion cycle, less pumping energy is required, leading to a fuel economy benefit. Engines that operate lean of stoichiometry can be classified as heavy-duty diesel, light-duty diesel, and direct-injection gasoline engines. Heavy-duty diesel engines are distinguished from light-duty diesel engines by their application and method for emissions certification. A heavy-duty engine is used in a high-load application, and is typically certified for use using an engine dynamometer, whereas a light-duty engine is used in a passenger vehicle or light truck, and is certified for use on a vehicle dynamometer.

Acceptance of compression-ignition engines and direct-injection spark-ignition engines has been limited due to the inability to comply with increasingly strict emissions regulations. Emissions regulations that are implemented in countries throughout the world include standards for allowable levels of exhaust gas constituents that are output as a result of the combustion process. The primary regulated exhaust gas constituents include hydrocarbons ('HC'), carbon monoxide ('CO'), nitrides of oxygen ('NOx'), and particulate matter ('PM'). Engine manufacturers meet various emissions regulations by designing engines, engine control systems and exhaust aftertreatment devices to reduce NOx to nitrogen ($N_2$) and oxygen ($O_2$), and oxidize HC, CO, and carbon and organic portions of the PM to water ($H_2O$) and carbon dioxide ($CO_2$). When compression-ignition engines and direct-injection spark ignition engines operate with a fuel charge that is at an air/fuel ratio that is lean of stoichiometry, the result is low engine-out emissions of CO and HC. However, lean operation also typically results in higher levels of engine-out emissions of NOx and PM.

Engine system developers have sought to reduce NOx and PM emissions of compression-ignition engines and direct-injection spark ignition engines using several different aftertreatment devices and control schemes. The aftertreatment devices include, for example, oxidation catalysts, lean NOx catalysts, NOx adsorber catalysts, diesel particulate traps, oxidation and three-way catalysts, and selective catalytic reduction catalysts. The aftertreatment devices are placed in an exhaust gas feedstream and are used in conjunction with engine management control schemes and added hardware to reduce tailpipe emissions below regulated levels.

A NOx adsorber catalyst is an aftertreatment device that is comprised of a ceramic or metal substrate having a washcoat that contains noble metals that are able to catalyze exhaust emissions at elevated temperatures. The noble metals typically include rhodium, platinum, and palladium. The washcoat typically contains barium and other alkali metals that adsorb and store NOx while the engine is operating with excess oxygen. The NOx adsorbed by a NOx adsorber catalyst must be periodically reduced, which is a process wherein NOx is desorbed from the catalyst and then catalyzed. If the NOx adsorber catalyst is not able to periodically reduce the NOx adsorbed, it eventually saturates, leading to breakthrough of NOx emissions. Desorption and catalysis of the NOx requires an exhaust gas feedstream that is rich of stoichiometry, preferably with catalyst bed temperatures above 200° C. The temperature of the exhaust gas feedstream also affects the amount of time that is required to reduce NOx adsorbed by the NOx adsorber catalyst. Currently available NOx adsorber catalysts perform optimally when the temperature of the exhaust gas feedstream is in the range of 350° C. to 450° C. This exhaust gas temperature range is difficult to achieve with a compression-ignition engine or direct-injection spark ignition engine that is operated under low-speed, light load driving conditions.

Reduction of NOx in the NOx adsorber catalyst comprises having the engine management system change the fuel charge from a lean air/fuel ratio to a rich air/fuel ratio for a predetermined amount of time. When the rich exhaust gas enters the NOx adsorber catalyst, the stored NOx is desorbed from the washcoat and reacts with exhaust gases including CO, hydrogen ($H_2$) and HC in the presence of the noble metals to form water ($H_2O$), carbon dioxide ($CO_2$), and nitrogen ($N_2$). The reduction cycle typically must occur regularly during operation of the engine. The engine management system resumes normal engine operation after reduction is complete. The prior art uses the engine management system to switch the fuel charge from a lean air/fuel ratio to a rich air/fuel ratio by reducing overall air intake or adding fuel during combustion. The reduction of air intake to the combustion cycle is accomplished by a combination of throttling, reduction in boost from a turbocharger, and increase in EGR. These methods adversely affect fuel economy, and potentially also affect engine performance.

The performance of a NOx adsorber catalyst is negatively affected by the presence of sulfur in fuel. Sulfur burns in the combustion process to form sulfates ($SO_2$ and $SO_3$). The NOx adsorber catalyst preferably selects and adsorbs sulfates over NOx. The sulfates are not released and reduced during periodic rich air/fuel ratio operation as readily as NOx is released. As a result, adsorbed sulfates reduce the capacity of the NOx adsorber to adsorb NOx.

Desulfation of the NOx adsorber catalyst requires a periodic excursion of the exhaust gas to high temperatures (catalyst bed temperatures of 650° C.) at a rich air/fuel ratio for an extended period of time, typically requiring minutes of operation. Desulfation must occur periodically over the life of the engine, typically every 3,000 to 10,000 miles or an equivalent number of hours of engine operation, depending on the level of sulfur in the fuel, fuel consumption of the engine, and the NOx storage capacity of the NOx adsorber catalyst.

The prior art also reduces NOx emissions using a selective catalytic reduction catalyst ('SCR catalyst'). The SCR catalyst is an aftertreatment device that is comprised of a catalyst and a system that is operable to inject material such as ammonia ('$NH_3$') into the exhaust gas feedstream ahead of the catalyst to reduce the NOx adsorbed by the catalyst. The SCR catalyst consists of a substrate and a washcoat containing noble metals that is capable of creating conditions for reduction of NOx by $NH_3$. This also includes the use of urea, which when decomposed in the exhaust, creates $NH_3$.

The prior art uses the SCR catalyst and operates the engine at a lean condition while injecting $NH_3$ or urea. The $NH_3$ or urea selectively combines with NOx to form $N_2$ and $H_2O$ in the presence of the catalyst. The $NH_3$ material must be periodically replenished. Use of urea or other sources of $NH_3$ requires precise control of injection. Overinjection may cause a release of $NH_3$ into the atmosphere, and underinjection may result in inadequate emissions reduction. The additional hardware to inject $NH_3$ must be diagnosed by an onboard diagnostic system, and potentially increases warranty.

A diesel particulate trap is an aftertreatment device that is typically comprised of a ceramic wall flow substrate having a washcoat that is operable to trap, or filter, carbon particulate matter. It may also contain noble metals, typically including platinum. The diesel particulate trap removes PM from the exhaust gas feedstream by passing the feedstream through pores in walls of the ceramic wall flow substrate. The diesel particulate trap must be periodically purged to prevent plugging and associated engine operating problems.

The prior art purges the diesel particulate trap by controlling the engine management system so the exhaust gas passing through the filter is at a high temperature (typically exhaust gas temperatures of 500° C. to 600° C.). This is significantly higher temperature than typically obtained at low speed, light load driving conditions. The high exhaust gas temperature combines with excess oxygen in the exhaust to oxidize carbon and organic PM and form $CO_2$. The purge cycle must occur periodically over the life of the engine, ranging from as frequently as every 100–500 miles for an engine operating at light load and low exhaust gas temperatures. Engines that typically operate at higher load conditions, and therefore at higher exhaust gas temperature, have to purge the diesel particulate trap less frequently. The engine management system performs purge of a diesel particulate trap by maintaining the fuel charge at a lean air/fuel ratio, and generating hot operation by injecting additional fuel into the combustion chamber at the end of the combustion cycle. This creates a combustible mixture in the diesel particulate trap, or in an oxidation catalyst that precedes the diesel particulate trap, such that heat generated by combustion of the combustible mixture enhances oxidization of the stored PM and forms $CO_2$. The engine management system resumes normal engine operation after purging is complete. This method adversely affects fuel economy and potentially also affects engine performance. This system may also increase HC emissions of the engine.

The prior art enhances purging of the diesel particulate trap by introducing a catalyst in the fuel system during normal operation so it accumulates and mixes with the trapped particulate matter. A tank containing a catalyst, typically liquid cerium in solution, is carried within the vehicle and selectively added to the fuel to accomplish mixing with the trapped particulate matter. The catalyst acts to reduce the temperature necessary for combustion of PM in the trap. The catalyst material must be periodically replenished, and the trap must also be purged of the catalyst material to prevent excess flow restriction.

Other aftertreatment devices used with engines that operate lean of stoichiometry include oxidation catalysts and three-way catalysts. These catalysts are comprised of a ceramic or metal substrate having a washcoat that contains noble metals. The noble metals for an oxidation catalyst typically include platinum or palladium. The noble metals for a three-way catalyst typically include rhodium, platinum, and palladium. These devices typically operate at or about stoichiometry.

Many of the above-described aftertreatment devices and systems require elevated exhaust gas temperatures for effective operation. The prior art has sought to increase exhaust gas temperatures by changing engine operation. This includes equipping a compression-ignition engine with a throttle and partially closing the throttle to reduce the amount of excess air reaching the engine. This acts to increase combustion temperatures and exhaust gas temperatures. The prior art has also increased engine exhaust gas re-circulation (EGR), changed timing of fuel injection relative to crank position, quantity of fuel injected, and changed valve timing to increase exhaust gas temperature. Attempts have also been made to increase exhaust gas temperature by directly oxidizing fuel in the exhaust, and by electrically heating catalytic devices. These approaches can increase exhaust gas temperature, but have the penalties of reducing fuel economy and increasing engine-out PM levels.

Exhaust gas temperatures can be increased using advanced engine control hardware and technology. Manufacturers of spark ignition engines have been implementing cylinder deactivation systems to broaden the dynamic operating range of a specific engine configuration, leading to improvements in engine efficiency and vehicle fuel economy. Cylinder deactivation is currently being implemented on throttled spark-ignition engines such as are commonly used in cars and light trucks. These engines obtain a relatively large fuel economy benefit (8% to 25%) from use of cylinder deactivation when operating at low power demand levels. This benefit is a result of reduced engine pumping losses obtained during operation of the cylinder deactivation system. Cylinder deactivation is currently not used on compression-ignition or direct-injection spark-ignition engines primarily because there is little efficiency gain or fuel economy benefit for these engines due to the fact that the engines normally operate in an unthrottled mode with excess air. Therefore compression-ignition or direct-injection spark-ignition engines generally have low pumping losses.

Pumping losses comprise the energy required to pump air from an intake system, through the engine, and out of the exhaust system. Pumping losses reduce the total amount of energy that the engine can translate into work. A typical multi-cylinder engine has an engine block with multiple cylinders, and a piston in each cylinder that is operably attached to a crankshaft. There is also at least one intake valve and at least one exhaust valve that allow passage of air into and out of each cylinder. A combustion chamber is formed inside each cylinder. The typical engine operates on a four-stroke cycle that sequentially includes an air intake stroke, a compression stroke, a power stroke, and an exhaust stroke. During the air intake stroke the piston moves away from the intake and exhaust valves and creates a negative pressure in the combustion chamber. Pumping loss during air intake is due to the negative pressure in the combustion chamber that is working against the movement of the piston away from the intake and exhaust valves. During the exhaust stroke the piston toward the intake and exhaust valves and creates a positive pressure in the combustion chamber. Pumping loss during exhaust is due to the positive pressure in the combustion chamber that is working against the movement of the piston toward the intake and exhaust valves.

When a cylinder is active, the pumping loss during air intake is a measure of a restriction in the air intake system and includes air flow restrictions between the combustion chamber and the outside air, and includes the intake valves, the intake manifold, any throttle device, and air cleaning device. The pumping loss during exhaust is a measure of a restriction in the exhaust system and includes airflow restrictions between the combustion chamber and the outside air, and includes the exhaust valves, the exhaust manifold, exhaust pipes, mufflers, resonators, and any exhaust aftertreatment devices, including catalytic converters and particulate traps. On engines employing an air throttle device, pumping losses are great during period of low power demand. This is caused by a large airflow restriction, and corresponding negative pressure, into the combustion chamber when the throttle device is only partially opened. Internal combustion engines and pumping loss measurement and description is well known to one skilled in the art.

When one or more cylinders are deactivated, there is a reduced demand in the intake system for incoming air. The reduced demand for incoming air results in less negative pressure being created in each combustion chamber during the intake stroke. On engines employing an air throttle device, the effect of the reduced demand for incoming air is more pronounced, in terms of the effect of the restriction on airflow. This results in less pumping loss through the engine, resulting in higher translation of energy into power, or work.

A cylinder deactivation system operates by collapsing the opening mechanism of the inlet and outlet valves of each deactivated cylinder, so the valves each remain in a closed position. Fuel delivery is also discontinued to each deactivated cylinder. This action stops the flow of air and fuel to each deactivated cylinder. When cylinder deactivation occurs, an engine controller operates the active cylinders with greater amount of fuel and air to meet the extant power demands of the engine and vehicle. The active cylinders each operate with greater airflow, reducing pumping losses due to throttling of the air intake, and improving fuel efficiency in the active cylinders. The active cylinders also achieve higher operating temperatures.

Hence, there is a need to provide an engine control system and exhaust aftertreatment system for engines that operate at an air/fuel ratio that is primarily lean of stoichiometry that is able to meet emissions regulations by effectively regenerating various components of the aftertreatment system, without adversely affecting fuel economy and engine performance. There is also a need to control an engine that operates at an air/fuel ratio that is primarily lean of stoichiometry such that the exhaust gas feedstream periodically operates at a rich air/fuel ratio, within a range of temperatures, for a sufficient amount of time to regenerate the aftertreatment system with a minimal effect upon fuel economy and performance. There is a further need to control an engine that operates at an air/fuel ratio that is primarily lean of stoichiometry such that the exhaust gas feedstream operates at a lean air/fuel ratio and within a range of temperatures for an amount of time sufficient to desulfate the aftertreatment system. This includes systems for use on compression-ignition engines and direct-injection spark-ignition engines.

SUMMARY OF THE INVENTION

The present invention is an improvement over conventional systems to control exhaust emissions of a multicylinder engine that operates primarily at an air/fuel ratio that is lean of stoichiometry, in that it provides a controller and cylinder deactivation system to regenerate an exhaust aftertreatment device, and also to increase exhaust gas temperature. The invention uses the cylinder deactivation system to control temperature and air/fuel ratio of an exhaust gas feedstream entering an aftertreatment device. The invention also increases the fuel charge to each non-deactivated cylinder sufficient to maintain operating power of the engine. The regeneration action includes desorbing and reducing NOx from a NOx adsorber catalyst, desulfating a NOx adsorber catalyst, and purging a diesel particulate trap. The cylinder deactivation system includes disabling intake valves and exhaust valves and discontinuing fuel delivery to at least one cylinder.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE INVENTION

Figure 1:
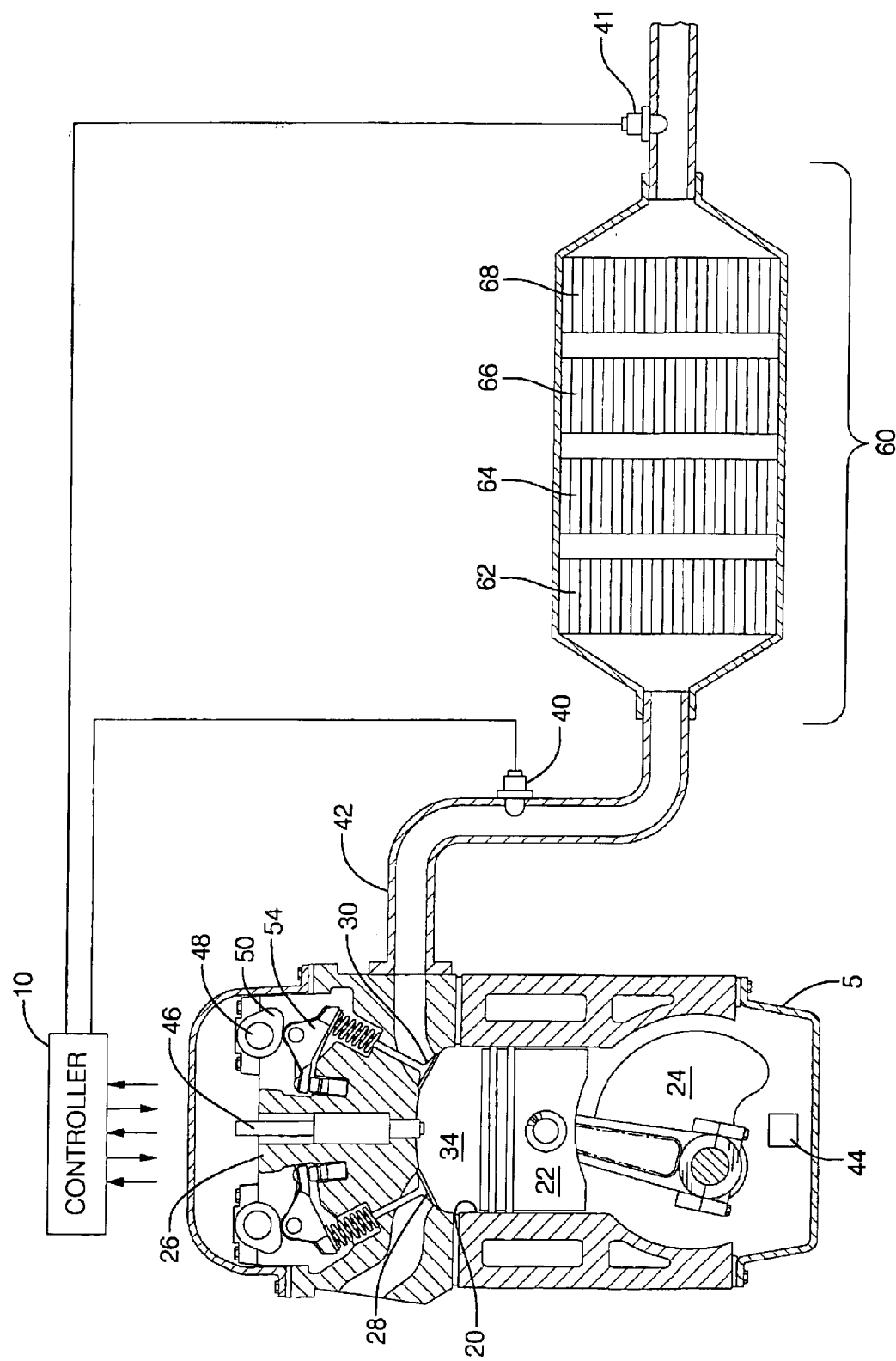
FIG. 1 is a schematic of an engine system in accordance with the present invention; and, FIG. 2 is a graph, in accordance with the present invention.

Referring now to the drawings, wherein the showings are for the purpose of illustrating the preferred embodiment of the invention only and not for the purpose of limiting the same, FIG. 1 shows an internal combustion engine 5, controller 10, and an exhaust aftertreatment system 60 which have been constructed in accordance with an embodiment of the present invention. The invention comprises a system and a method for reducing overall exhaust emissions from a multi-cylinder internal combustion engine 5 that primarily operates lean of stoichiometry. Three embodiments are included in this invention, including a heavy-duty diesel (compression ignition) engine, a light-duty diesel (compression ignition) engine, and a direct-injection (spark ignition) engine. Each embodiment is comprised of the engine 5 with the controller 10, the cylinder deactivation system, and the exhaust aftertreatment system 60.

In each embodiment, the internal combustion engine is comprised of a plurality of cylinders, each cylinder 20 containing a piston 22 that is operably attached to a crankshaft 24 at a point that is eccentric to an axis of rotation of the crankshaft 24. There is a head 26 at the top of the piston 22 containing at least one intake valve 28, at least one exhaust valve 30, and fuel injector 46. A combustion chamber 34 is formed within the cylinder 20 between the piston 22 and the head 26. A combustion charge is created in the combustion chamber 34 by an intake of air through the intake valve 28 when the valve 28 is opened, and an injection of fuel using the fuel injector 46.

When the engine is a compression-ignition engine, the combustion charge is ignited by temperature resulting from force of compression caused by the movement of the piston 22 toward the head 26, according to predetermined conditions. When the engine is a spark-ignition engine, the combustion charge is ignited by a spark plug (not shown) contained in the head 26, and operably connected to an ignition coil (not shown) that is controlled by the controller 10. In either case, the ignition of the air and fuel causes a rapid increase in pressure in the combustion chamber 34, which forces the piston 22 to move linearly along the length of the cylinder 20, away from the head 26. The movement of the piston 22 in turn causes the crankshaft 24 to rotate. The crankshaft 24 causes the piston 22 to again move toward the head after the crankshaft 24 has rotated to a furthest point of eccentricity. The design and operation of compression-ignition and spark-ignition internal combustion engines is well known to one skilled in the art.

Referring again to FIG. 1, the internal combustion engine 5 is configured with sensors that are operable to measure engine performance and an operator's requirement for power, and output devices that are operable to control engine performance. The sensors preferably comprise a mass air flow sensor (not shown) located at the air inlet to the engine, an exhaust gas sensor 40 for engine control that is located in an exhaust manifold 42 or downpipe, a second exhaust gas sensor 41 for diagnostics and engine control that is located behind the aftertreatment device 60, the engine speed sensor 44, pedal position sensor (not shown), and other sensors. The controller 10 is operably connected to each sensor such that it is able to collect engine performance information. The design and implementation of engine sensors is known to one skilled in the art.

The output devices comprise a plurality of fuel injectors with an individual fuel injector 46 provided for each cylinder 20, and a cylinder deactivation system, among other output devices. Each individual fuel injector 46 is preferably mounted in the head 26 such fuel is injected directly into each combustion chamber 34. The controller 10 is operable to individually control fuel delivery to each cylinder 20 using each fuel injector 46. Configuration of a fuel injection system is known to one skilled in the art. The controller 10 collects information from the sensors to determine engine performance parameters and controls the output devices using control algorithms and calibrations that are internal to the controller 10. The controller 10 is operable to determine an operating point of the engine 5, based upon engine speed, as determined by the engine speed sensor 44, the fuel delivery to the engine 5, and other monitored conditions. One skilled in the art is able to determine an engine operating point based upon engine speed and fuel delivery, and also able to control fuel delivery.

The cylinder deactivation system is preferably comprised of hardware mounted in the head 26 and control algorithms that are internal to the controller 10. The cylinder deactivation hardware includes a valve opening mechanism 54 for each valve 28, 30 of each cylinder 20 that is operable to be deactivated. The cylinder deactivation system also comprises a hydraulic subsystem (not shown) that preferably supplies pressurized oil from an engine oil pump (not shown) to each valve opening mechanism 54. There is also a solenoid valve (not shown) in the hydraulic subsystem that is operably connected to the controller 10 and is operable to control flow of oil to each valve opening mechanism 54 for each cylinder 20. The valve opening mechanism 54 is comprised of a lifter (not shown) and a locking pin mechanism (not shown) that is inserted between the camshaft 48 and each valve 28, 30.

The cylinder deactivation system is operable to disable each intake valve 28, each exhaust valve 30, and each fuel injector 46 for each cylinder 20 that is to be deactivated. In this embodiment, the cylinder deactivation system disables half of the cylinders when in the deactivation mode. For example, an eight-cylinder engine operates with four cylinders in deactivation mode, and a six-cylinder engine operates with three cylinders in deactivation mode. A typical valvetrain is comprised of the camshaft 48, and the plurality of valves 28, 30 that are normally closed and are spring-mounted in the head 26. A valve train is operable to open the plurality of exhaust valves 30, the plurality of intake valves 28, or both, depending upon the engine design. The camshaft 48 is a long rod that is mounted in the engine 5 and rotates around its longitudinal axis. It has cam lobes that correspond to each valve 28, 30 and that are typically cut into the camshaft 48 such that they are eccentric to the axis of rotation. Each lobe 50 has an eccentric portion and a portion that is concentric to the longitudinal axis, referred to as the cam base circle. Each lobe is in physical contact with a valve opening mechanism 54, which is comprised of a lifter and a locking pin mechanism. The valve opening mechanism 54 is in physical contact with each valve 28, 30. The rotation of the camshaft 48 causes each valve 28, 30 to open when the position of the camshaft is such that the eccentric portion of the lobe is in contact with the valve opening mechanism 54.

Referring again to FIG. 1, the internal combustion engine 5 also includes the exhaust aftertreatment system 60. The aftertreatment system 60 is preferably comprised of different elements, depending upon the specific engine 1. The elements of the aftertreatment system 60 may include at least one oxidation catalyst, a NOx adsorber catalyst, a diesel particulate trap, and a three-way catalyst or an additional oxidation catalyst.

An oxidation catalyst element is preferably comprised of a ceramic substrate having a washcoat that contains a sufficient amount of noble metals to effectively catalyze HC and CO emissions. The noble metals for the oxidation catalyst are preferably platinum or palladium. The oxidation catalyst acts upon exhaust gases passing through by preferably oxidizing HC and CO molecules to $H_2O$ and $CO_2$ in the presence of oxygen. Design considerations include, for example, substrate cell density, cross-section area, volume and location, relative to the engine 5, and washcoat and noble metal content. One skilled in the art is able to design an oxidation catalyst to match the requirements of the engine and exhaust gas feedstream to meet a given emissions regulation.

A NOx adsorber catalyst is preferably comprised of a ceramic substrate having a washcoat that contains a sufficient amount of noble metals to effectively adsorb NOx emissions. The noble metals for the NOx adsorber catalyst include rhodium, platinum, and palladium. The washcoat contains sufficient quantities of barium and other alkali metals to adsorb and store NOx while the engine is operating with excess oxygen. A typical NOx adsorber catalyst is able to adsorb NOx at catalyst bed temperatures above 150° C., preferably above 200° C. The NOx stored in the NOx adsorber catalyst must be periodically reduced, which comprises desorption and catalysis of the NOx emissions in an exhaust gas feedstream that is rich of stoichiometry. Desorption of NOx from the NOx catalyst occurs at catalyst bed temperatures above 170° C. Catalysis of NOx emissions occurs at catalyst bed temperatures in excess of 200° C., and is most effective above 250° C. Design considerations include, for example, substrate cell density, cross-section area, volume and location, relative to the engine 5, and washcoat and noble metal content. One skilled in the art is able to design an NOx adsorber catalyst to match the requirements of the engine, exhaust gas feedstream, and reduction scheme that is able to meet a given emissions regulation.

A diesel particulate trap is an aftertreatment device that is preferably comprised of a ceramic wall flow substrate having a washcoat that is operable to trap PM. It may also contain noble metals, typically including platinum. The diesel particulate trap must be periodically purged, which comprises operating at an exhaust gas temperature of 400° C. to 600° C. to oxidize PM and form $CO_2$. The purge cycle must occur periodically over the life of the engine, typically every 3000 to 10,000 miles or equivalent hours of engine operation. One skilled in the art is able to design an diesel particulate trap to match the requirements of the engine, exhaust gas feedstream, and purge mode that is able to meet a given emissions regulation.

A three-way catalyst is an aftertreatment device that is preferably comprised of a ceramic substrate having a washcoat that contains a sufficient amount of noble metals to effectively catalyze HC, CO, and NOx emissions. The noble metals for the three-way catalyst are preferably rhodium, plus platinum or palladium. The three-way catalyst acts upon exhaust gases passing through by preferably oxidizing HC and CO molecules to $H_2O$ and $CO_2$ in the presence of a lean air/fuel ratio environment, and also preferably reducing NOx to $N_2$ in a rich air/fuel ratio environment. Design considerations include, for example, substrate cell density, cross-section area, volume and location, relative to the engine 5, and washcoat and noble metal content. One skilled in the art is able to design a three-way catalyst to match the requirements of the engine and exhaust gas feedstream to meet a given emissions regulation.

Cylinder deactivation comprises disabling air flow and fuel flow to one or more cylinders, using the cylinder deactivation hardware and control algorithms described previously, in reference to FIG. 1. The quantity of cylinders that are deactivated, and the selection of specific cylinders to deactivate, are specific to a given system, and based upon a determination of issues including the engine operating point, engine dynamics and vibration. For example, a typical eight-cylinder engine in a V-engine configuration preferably disables non-opposing cylinders on each bank of the V-engine. A typical six-cylinder engine disables all three cylinders on a bank of the V-engine. Cylinder deactivation for controlling temperature of the exhaust gas continues as long as the operating point of the engine remains below a predetermined level, or the coolant temperature is below the operating range of 82° C. to 91° C., or the exhaust gas temperature is below an optimal operating temperature of the aftertreatment device, e.g. 250° C.

Referring now to FIG. 2, an output from an engine-modeling program is provided. The engine-modeling program is a program called GT-POWER, which is a commercially available computer-aided engineering and simulation tool from Gamma Technologies. It is designed for analysis of advanced engine and powertrain control systems. A six-cylinder compression-ignition engine with a turbocharger was modeled, wherein it was operated with all six cylinders functioning, and also with three of the six cylinders deactivated, as described previously.

Referring again to FIG. 2, data was generated using GT-POWER that shows engine power as a function of fuel flow to each cylinder, when the engine was operated at a specific speed, which was 1800 rpm ('revolutions per minute') for this example. FIG. 2A shows a graph of engine BMEP ('brake mean effective pressure') as a function of fuel delivery per injector stroke, which occurs once per cylinder event. Engine BMEP is a measure of an operating point of an engine. The graph shows BMEP as a function of fuel delivery for the engine when all 6 cylinders are active, and when only 3 of the 6 cylinders are active, with the engine operating under warmed up, steady-state conditions. The fuel delivery per injector stroke, which is the fuel delivery to each active cylinder, must approximately double for each cylinder event in order to maintain the same level of BMEP for the engine. For example, to maintain BMEP at 9 bar with all 6 cylinders operating (see item C), the fuel delivery system must deliver 120 mg. of fuel per injector stroke. However, to maintain BMEP at 9 bar with only 3 of 6 cylinders operating (see item D), the fuel delivery system must deliver 240 mg. of fuel per injector stroke. Therefore the need to maintain the operating point of the engine leads to an increase in an amount of fuel delivered to each cylinder, for each cylinder event.

Referring to FIG. 2B, data was generated using GT-POWER showing exhaust gas temperature as measured at an output of the turbocharger, as a function of fuel flow, when the engine was operated at a specific speed, which was 1800 rpm for this example. To reach the same operating point, in terms of BMEP ('brake mean effective pressure') from an engine, the total fuel flow into the engine must be the same. Item A of the line representing operation with 3 active cylinders is operating at the same engine operating point as item B on the line representing operation with 6 active cylinders, based upon fuel flow to the engine. The exhaust temperature for item A is approximately 920 K, or 647° C. with 3 active cylinders, whereas the exhaust temperature measured for item B is approximately 600 K, or 327° C., with 6 active cylinders. These results demonstrate that there is a difference in exhaust gas temperature of 320° C. when operating the same engine with only three active cylinders instead of all six cylinders being active. This difference in exhaust gas temperature can be used by the exhaust aftertreatment system 60 to better accomplish specific operations of NOx adsorption, NOx reduction, diesel particulate trap purging, and desulfation of the NOx adsorber.

The engine 5 with the controller 10, the cylinder deactivation system, and the aftertreatment system 60 preferably operates in different modes to accomplish and enhance specific functions related to aftertreatment of exhaust gas from the engine 5. The different modes each provide an ability to capture and convert exhaust gases passing through the aftertreatment system 60, and an ability to regenerate the aftertreatment system 60. The capture and convert modes comprise adsorbing NOx in the NOx adsorber, capturing PM in the diesel particulate trap, dealing with $SO_2$ and $SO_3$ that pass through the NOx adsorber. The regeneration modes comprise desorbing and reducing NOx in the NOx adsorber, purging the diesel particulate trap, and desulfating the NOx adsorber.

The engine 5 and the controller 10 preferably use the cylinder deactivation system to increase exhaust gas temperature during normal operation. This operation includes deactivating cylinders and enriching the fuel charge to each non-deactivated cylinder 20 by an amount sufficient to maintain the operating point of the engine 5. The result of this operation is that the temperature of the aftertreatment device 60 is maintained in a range necessary for optimal operation and regeneration. Specifically, the engine 5 must be engaged in the NOx adsorption mode under normal engine operation, wherein the exhaust gas contains NOx emissions that must be reduced. In the NOx adsorption mode, the controller 10 is operable to deactivate at least one engine cylinder 20 and increase a fuel charge for the non-deactivated cylinders using the fuel injectors 46, as described in reference to FIG. 1. This raises exhaust gas temperature to a sufficient level for catalyst bed temperatures to exceed the desired temperature of 200° C. for effective storage, as described previously. One skilled in the art is able to determine a range of engine operating points at which cylinder deactivation can occur to achieve the desired catalyst bed temperature in the NOx adsorption mode.

The engine must operate in the NOx reduction mode before the NOx adsorber catalyst becomes saturated, to prevent NOx breakthrough and elevated NOx emissions. Prior to operating in the NOx reduction mode, the exhaust gas temperature must be in the range of 200° C. to 300° C. to effectively store NOx in the adsorber catalyst. This operation may also require cylinder deactivation to effectively increase the exhaust gas temperature. The NOx reduction mode comprises a brief excursion (less than 10 seconds) into a rich air/fuel ratio range to effectively desorb and reduce NOx emissions in the NOx adsorber. The controller 10 is operable to deactivate at least one engine cylinder and increase fuel charge for the non-deactivated cylinders using the fuel injectors 46, as described with reference to FIG. 1. The controller 10 concurrently further increases the fuel charge to maintain the operating point of the engine and to generate a rich exhaust gas air/fuel ratio, based upon input from the engine-out exhaust gas sensor 40. This action raises exhaust gas temperature to a sufficient level for catalyst bed temperatures to exceed a desired temperature of 200° C. or higher. The engine operating points are specific to the engine application, the emissions regulations, and the aftertreatment system. One skilled in the art is able to determine a range of engine operating points at which cylinder deactivation can occur to help achieve the desired catalyst bed temperature and air/fuel ratio.

The engine 5 must periodically operate in the purge mode to prevent plugging of the diesel particulate trap. The purge mode comprises extended operation at an elevated exhaust gas temperature to achieve a diesel particulate trap bed temperature of 400° C. to 600° C. in order to oxidize carbon and organic PM and form $H_2O$ and $CO_2$. The controller 10 is operable to deactivate at least one engine cylinder 20 and increase fuel charge for the non-deactivated cylinders, to maintain the operating point of the engine, as described previously in reference to FIG. 1. The controller 10 is operable to deliver an additional quantity of fuel to the exhaust gas feedstream to provide unburned fuel into the diesel particulate trap during purging. In this embodiment, the controller 10 is operable to cause at least one fuel injector 46 to deliver the additional quantity of fuel at the end of each combustion stroke to provide unburned fuel into the diesel particulate trap during purging. The combination of high diesel particulate trap bed temperature (near 550° C.), a lean air/fuel ratio exhaust gas stream and unburned fuel in the exhaust gas feedstream creates conditions necessary to effectively purge PM from the diesel particulate trap. The engine operating points at which purge occurs is specific to the engine application, the emissions regulations, and the aftertreatment system. One skilled in the art is able to determine a range of engine operating points at which cylinder deactivation with extra fuel can occur to achieve the desired catalyst bed temperature for diesel particulate trap purging. The engine operating points are specific to the engine application, the emissions regulations, and the aftertreatment system. The purge cycle must occur periodically over the life of the engine, typically every 350 miles or 10 hours of engine operation. One skilled in the art is able to determine an appropriate method to schedule effective purging of a diesel particulate trap.

The engine must periodically operate in the desulfation mode to reverse sulfur poisoning of the NOx adsorber catalyst. The desulfation mode comprises operating for an extended amount of time at NOx adsorber catalyst bed temperatures near 650° C., in a rich air/fuel ratio environment, in order to desorb $SO_2$ and $SO_3$ from the NOx adsorber catalyst. The desorbed sulfur may be further reduced to $SO_2$ or $H_2S$ in rich conditions. The controller 10 is operable to deactivate at least one engine cylinder 20 and increase fuel charge for the non-deactivated cylinders, to maintain the operating point of the engine 5, achieving a moderate to high load operating point in order to achieve desired exhaust gas temperature. The controller 10 concurrently further increases the fuel charge such that the air/fuel ratio is rich of stoichiometry. This action raises exhaust gas temperature to a sufficient level for catalyst bed temperatures to achieve the desired temperature of 650° C. and also achieves rich of stoichiometry exhaust conditions for effective desorption and reduction, as described previously. The engine operating points necessary to achieve the desired temperature and air/fuel ratio are specific to the engine application, the emissions regulations, and the aftertreatment system. One skilled in the art is able to determine a range of engine operating points at which cylinder deactivation can occur to achieve the desired NOx adsorber catalyst bed temperature and air/fuel ratio for desulfation. The desulfation cycle must occur periodically over the life of the engine. One skilled in the art is able to determine an appropriate method to schedule effective desulfation.

Determining when there is a need to regenerate the aftertreatment device 60 is preferably accomplished by creation of an algorithm that is executed in the controller 10. The controller 10 is able to monitor engine operating conditions with various sensors, as described previously in reference to FIG. 1, also monitor exhaust gas conditions using the exhaust gas sensors 40, 41. The algorithm in the controller 10 is preferably comprised of a mathematical model that uses the engine operating conditions and information from the exhaust gas sensors 40, 41 to estimate a cumulative amount of NOx and other exhaust gas constituents. This estimate can be combined with information about the storage capacity of the exhaust aftertreatment device 60 to determine when the aftertreatment device 60 will likely become saturated, or otherwise cause the exhaust emissions to exceed regulated levels. One skilled in the art is able to create, calibrate and execute an algorithm in the controller that is capable of estimating a cumulative amount of exhaust gas created by an engine and stored in an aftertreatment device. One skilled in the art is further able to develop and execute a scheme that regenerates an aftertreatment device prior to exceeding applicable regulated emissions levels. One skilled in the art is further able to develop the regeneration scheme such that it is able to determine a cumulative amount of regeneration of the aftertreatment device 60 and therefore determine an amount of regeneration that is subsequently needed.

Specific Embodiments

I. Light-duty Diesel Engine

When system is a light-duty diesel (i.e. compression-ignition) engine, the system comprises the engine 5 with the controller 10, the cylinder deactivation system, and the aftertreatment system 60. The aftertreatment system 60 is preferably comprised of an oxidation catalyst 62, a NOx adsorber catalyst 64, a second oxidation catalyst 66, and a diesel particulate trap 68. Each of the above-mentioned elements has been described previously. The light-duty diesel engine 5 with the controller 10, the cylinder deactivation system, and the aftertreatment system 60 is preferably operated in the NOx adsorption mode, the NOx reduction mode, the purge mode, and the desulfation mode, as described previously.

II. Heavy-duty Diesel Engine

When system is a heavy-duty diesel (i.e. compression-ignition) engine, the system comprises the engine 5 with the controller 10, the cylinder deactivation system, and the aftertreatment system 60. The aftertreatment system 60 is preferably comprised of an oxidation catalyst 62, a diesel particulate trap 64, a NOx adsorber catalyst 66, and a second oxidation catalyst 68. Each of the above-mentioned elements has been described previously. The heavy-duty diesel engine 5 with the controller 10, the cylinder deactivation system, and the aftertreatment system 60 is preferably operated in the NOx adsorption mode, the NOx reduction mode, the purge mode, and the desulfation mode, as described previously.

III. Direct Injection Gasoline Engine

When system is a direct-injection gasoline (i.e. spark-ignition) engine, the system comprises the engine 5 with the controller 10, the cylinder deactivation system, and the aftertreatment system 60. The aftertreatment system 60 is preferably comprised of an oxidation catalyst 62 and a NOx adsorber catalyst 64. Each of the above-mentioned elements has been described previously. The direct-injection gasoline engine 5 with the controller 10, the cylinder deactivation system, and the aftertreatment system 60 is preferably operated in the NOx adsorption mode, the NOx reduction mode, and the desulfation mode, as described previously.

It is understood that alternate embodiments of this invention may be envisioned. The invention also includes all internal combustion engines that primarily operate lean of stoichiometry, including spark-ignition engines, direct-injection spark-ignition engines, and homogeneous-charge, compression-ignition engines. The invention also includes all applications of internal combustion engines whether vehicle applications or stationary engines, wherein emissions regulations have been implemented.

The invention also encompasses other methods of cylinder deactivation different from the method of disabling each intake and exhaust valve and each fuel injector for each cylinder that is disabled. For example, these methods may include deactivating only the fuel injector, or deactivating only one valve and the fuel injector. The method also encompasses other methods of delivering fuel to the combustion chamber. These methods also encompass other valve deactivation schemes, in addition to using the locking pin mechanism described in the embodiment. The invention encompasses other valve opening schemes, for example systems which use electrically-actuated solenoids to open and close valves. The invention also includes alternative methods and apparatus to intake or exhaust air into the combustion chamber, including systems that do not use camshafts or valves. The invention also encompasses systems that are able to deactivate a different number of cylinders other than half the cylinders, as described in the embodiment. For example, a system may be operable to deactivate only two of eight cylinders in an engine, or two of six cylinders in an engine. The invention also encompasses all combinations of selecting cylinders for deactivation, including deactivating all cylinders on a bank of an engine, or alternating cylinders, or opposite cylinders. The invention also encompasses other methods and devices for delivering fuel to the exhaust gas feedstream as part of purging the diesel particulate trap, including additional hardware to deliver fuel into the aftertreatment system 60. The invention also encompasses other exhaust aftertreatment devices that require periodic regeneration, including diesel particulate traps, SCR catalysts, three-way catalysts, and all combinations of these devices. The invention also encompasses other exhaust aftertreatment devices that integrate two or more of the aforementioned aftertreatment devices, for example a diesel particulate trap that has been combined with a NOx adsorber. The invention also encompasses other sensors operable to measure exhaust gas, including oxygen sensors, wide range air/fuel sensors, and exhaust gas constituent sensors. It also encompasses other means of determining air/fuel ratio, such as determining air/fuel ratio by measurement of engine airflow and determining fuel flow by calculating fuel delivered through the fuel injection system.

The invention also encompasses other systems that use variations on the methods mentioned herein, in which the exhaust gas feedstream is shifted to a rich air/fuel ratio, increased in temperature, or a combination of both for the purpose of the normal operation or periodic regeneration or other specialized operation of exhaust treatment devices. These variations may include, but are not limited to, variations in the mechanisms to deliver a substitute reductant, including output from a diesel fuel reformer. Also encompassed are systems that are able to reduce flow of air into the engine or exhaust, including variable valve actuation systems, various forms of turbocharger control such as wastegate control or variable geometry turbocharger control, and various schemes by which some or all exhaust is diverted from one or more catalyst elements during regeneration.

The invention has been described with specific reference to the preferred embodiments and modifications thereto. Further modifications and alterations may occur to others upon reading and understanding the specification. It is intended to include all such modifications and alterations insofar as they come within the scope of the invention.

What is claimed is:

1. A system to regenerate an exhaust aftertreatment device of a multicylinder engine that operates primarily at an air/fuel ratio that is lean of stoichiometry, comprising:

a controller operable to deactivate at least one cylinder using a cylinder deactivation system and operable to enrich a fuel charge to each non-deactivated cylinder using a fuel control system, based upon input from at least one sensor operable to monitor an engine operating condition and based upon input from a sensor operable to measure exhaust gas;

wherein the exhaust aftertreatment system comprises a diesel particulate trap, an oxidation catalyst, and an NOx adsorber;

wherein said controller is operable to maintain an operating point of the engine, and wherein said controller operates the engine at an air/fuel ratio that is rich of stoichiometry such that a temperature of the NOx adsorber is sufficient to desulfate the NOx adsorber.

2. The system of claim 1, wherein the diesel particulate trap is catalyzed.

3. The system of claim 1, wherein the multicylinder engine comprises a compression-ignition engine.

4. The system of claim 1, wherein the multicylinder engine comprises a direct-injections spark-ignition engine.

5. The system of claim 1, wherein the multicylinder engine comprises a homogeneous charge, compressor ignition engine.

6. The system of claim 1, wherein the sensor operable to measure exhaust gas comprises an exhaust gas oxygen sensor.

7. The system of claim 1, wherein the sensor operable to measure exhaust gas comprises a wide-range air/fuel sensor.

8. The system of claim 1, wherein the sensor operable to measure exhaust gas comprises a gas constituent sensor.

* * * * *